United States Patent
Shih et al.

[11] Patent Number: 5,999,271
[45] Date of Patent: Dec. 7, 1999

[54] METHODS AND DEVICES TO DETERMINE THE WAVELENGTH OF A LASER BEAM

[76] Inventors: Ishiang Shih, 3300 Bahama Street, Brossard Quebec, J4Z 2R4; Linh Ngo Phong, 1035 Viger Street, Sainte Foy, Quebec, G1W 2P8; Shaolin Shi, 6215 Parny Street, Brossard, Quebec, J4W 1L2; Cindy Xing Qiu, 6215 Bienville Street, Brossard, Quebec, J4Z 1W2, all of Canada

[21] Appl. No.: 09/088,438

[22] Filed: Jun. 1, 1998

[51] Int. Cl.⁶ .................................................. G01N 21/25
[52] U.S. Cl. ....................... 356/419; 250/226; 250/214 R
[58] Field of Search ........................ 356/402–411, 425, 356/414–419, 300; 250/226, 214 PR

[56] References Cited

U.S. PATENT DOCUMENTS

| | | |
|---|---|---|
| 2,896,086 | 7/1959 | Wunderman . |
| 4,054,389 | 10/1977 | Owen . |
| 4,308,456 | 12/1981 | Van Der Gaag et al. . |
| 4,520,381 | 5/1985 | Moriguchi et al. . |
| 5,061,066 | 10/1991 | Ohno et al. . |
| 5,166,755 | 11/1992 | Gat . |
| 5,225,894 | 7/1993 | Nicholson et al. . |
| 5,266,792 | 11/1993 | Crowne et al. . |
| 5,703,357 | 12/1997 | Shih et al. . |
| 5,823,950 | 10/1998 | Diab et al. . |
| 5,898,502 | 4/1999 | Horiuchi et al. . |

*Primary Examiner*—K P Hantis

[57] ABSTRACT

Methods for wavelength determination of a monochromatic light beam are described. The methods involve a detector unit containing at least one pair of photo detectors. One of the detectors in each detector pair is covered with a variable attenuator and the other is not covered by the variable attenuator. The optical transmission coefficient of the variable attenuator is a monotonic function of wavelength. Under illumination of a monochromatic light, the photocurrents produced in the detectors with and without the variable attenuator are compared. The relative values of the photocurrents are used to determine the wavelength of the monochromatic light.

20 Claims, 11 Drawing Sheets

METHODS AND DEVICES TO DETERMINE THE WAVELENGTH OF A LASER BEAM

The government of Canada has certain rights on this patent.

FIELD OF THE INVENTION

The invention relates generally to methods for wavelength determination of light beams and, in particular, for the wavelength determination of pulsed laser beams.

BACKGROUND OF THE INVENTION

A pulsed laser beam is often used by the enemy to target a tank, ship, air craft or strategic site and to guide the projectiles in attacking the above targets. Once the pulsed laser beam has been sent, the enemy's detection system will detect the reflected pulsed laser beam and analyze the delay to determine, for instance, the distance. Pulsed laser beams thus constitute threats in the battle field. In order to avoid the enemy attack, a jamming means or counter attack means must be exercised before or immediately after the attack. To achieve this effectively, it is required to identify the wavelength of the pulsed laser beam. For instance, if the wavelength of the threatening pulsed laser beam is known, then a pulsed laser tuned at the same wavelength can be switched on to emit pulses to confuse the enemy laser detection system. Alternatively, a counter attack means equipped with a laser beam seeking apparatus tuned at the enemy laser wavelength may be launched to destroy the enemy laser and detection system.

Spectral measurements of optical sources are generally made in three ways: [1] using an interferometer, [2] using a dispersing device and [3] using a filter device. Methods using the interferometer usually require delicate apparatus and precise motion of mirrors for the determination of wavelengths.

Most methods involving interferometers have several drawbacks which prevent their use in practical fields, for a instance, for the wavelength discrimination of single pulses or repetitive pulses. These drawbacks include: [1] the requirements of precise motion for the mirrors, [2] the incident angle of the beam must be known or adjusted with respect to the interferometer, [3] the equipment used is bulky. Methods involving the dispersing device or filter device for the laser spectral determination usually require an array of optical detectors, each connected to an amplifying and multiplexing circuit. For methods involving optical filters for separating the wavelengths, an optical filter with a very narrow pass band corresponding to the wavelength value to be detected is mounted in front of a detector. In order to achieve the wavelength resolution, the number of narrow band pass filters and the number of optical detectors must be large, making the wavelength determination unit too bulky and too slow to react to the incident laser threats. Different spectral analysis units using integrated detector arrays have been proposed. For instance, the U.S. Pat. No. 5,166,755 issued on Nov. 24, 1992 to Gat disclosed a spectrometer apparatus. The Gat apparatus consists of an array of monolithic photosensitive elements and a linear variable filter (LVF) where the number of photosensitive elements is at least the number of wavelengths to be discriminated. Therefore, the resolution of the Gat spectrometer is limited by the number of photosensitive elements current technology can produce and the relatively long total data acquisition time required. Since the number of photosensitive elements is large, the Gat spectrometer may not function when used in the detection of single laser pulses or repetitive pulses. Since the detector array is fabricated on a planar substrate, a finite gap exists between adjacent detector elements. When the position of the LVF for the maximum transmission of the incoming light falls within this gap, the accuracy of the wavelength determination may be reduced considerably.

A unit for the discrimination of a pulsed laser beams has been disclosed in U.S. Pat. No. 5,225,894 issued on Jul. 6, 1993 to Nicholson, Parker, Mathur and Hull. The Nicholson unit consists of broadband filters, optical fiber delay lines with different delay times and detectors. An incoming pulsed laser beam is divided into different portions and each is guided through a delay line. Signals from all of the delay lines are collected and compared with the signals obtained without the delay lines. From the delay time and the transmission properties of the optical filter, the wavelength of the incoming pulsed laser beam is deter mined. Although the number of the detectors is reduced as compared to the Gat apparatus, optical fiber delay lines with different lengths must be employed in the Nicholson unit. In order to obtain a significant time delay for an unequivocal delay time determination, the length of the optical fibers must be relatively large and a complicated time counting circuit must be included in the unit, making the Nicholson unit too bulky to be used in various field applications. In addition to the above, the enemy may launch repetitive pulses with very short intervals between the pulses. In such conditions, it may not be possible to discriminate the wavelength of the laser threats using the Nicholson unit, which relies on counting the time delay of well defined pulses for the wavelength determination. Another drawback of the Nicholson method is that it may not easily be extended to other wavelength regions, such as 3–5 $\mu$m and 8–12 $\mu$m, due to the various constraints for the delay lines.

In order to overcome the above drawbacks, a novel method using a detector pair has been developed for the determination of laser wavelength. The principle of the wavelength discriminating using the detector pair has been disclosed in a pending patent application Ser. No. 08/310, 329, filed on Sep. 22, 1994 now U.S. Pat. No. 5,703,357. The active area of one of the detector elements increases with distance in one direction and the other decreases with the distance. A linear variable narrow band filter (LVF) is placed in front of the detector to define a light strip, the position of which is a function of the wavelength. By measuring the ratio of photo current of the two detector elements, the position of the light strip and thus the wavelength of the monochromatic light can be determined.

The above wavelength determination method still has some drawbacks. Firstly, the length of the detector elements will have to be approximately equal to the length of the LVF. The length of the LVF is determined by the range of wavelength to be covered and the wavelength resolution. For instance, a LVF for 0.6 to 1.1 $\mu$m operation with a half height band width of 10 nm is about 15 mm. Secondly, only a small portion of the detector elements is illuminated by the incident light beam. For instance for the LVF of wavelength range 0.6 to 1.1 $\mu$m and a half height band width of 10 nm, the ratio of the width of the illuminated detector and the total length is about 10 (nm)/[1100–600](nm)=1/50. Because of the above drawbacks, the detector elements are not operated in the best signal to noise ratio conditions. This is due to the presence of the leakage current and the parasitic capacitances associated with the regions not illuminated by the light.

In view of the above, there is a need to develop more advanced methods for the wavelength determination.

SUMMARY OF THE INVENTION

It is an object of the invention to provide a wavelength determination method that does not require a LVF and/or a large number of narrow band pass filters/detectors. It is a further object of the present invention to provide a device that can achieve pulsed wavelength discrimination without the need of a large number of optical detectors or optical delay lines.

A method for detection and wavelength discrimination of a monochromatic light beam, according to one embodiment of the present invention, with at least one detector pair consisting of a first photodetector and a second photo detector aligned with the first photo detector and a wavelength dependent variable attenuator on top of said second detector comprises measuring a first photo current generated in said first photo detector due to illumination by said monochromatic light beam; measuring a second photo current generated in said second photo detector due to illumination by said monochromatic light beam through said variable filter; obtaining a ratio between said second photo cur rent's value and said first photo current's value; and determining the wavelength of said light beam from said ratio.

A device for detection and wavelength discrimination of a monochromatic light beam, according to another embodiment of the present invention, comprises at least one detector pair consisting of a first photo detector and a second photo detector adjacent to each other on a single substrate, a thin film wavelength dependent variable attenuator being superimposed on a surface of the second photo detector, the device having means for measuring a first photo current generated in said first photo detector due to illumination by said monochromatic light beam; means for measuring a second photo current generated in said second photo detector due to illumination by said monochromatic light beam through said variable filter; means for obtaining a ratio between said second photo current and said first photo current; and means for determining the wavelength of said light beam from said ratio.

BRIEF DESCRIPTION OF THE DRAWINGS

The invention will now be described in more detail with reference to accompanying drawings, in which.

DESCRIPTION OF THE PREFERRED EMBODIMENTS

Figure 1:
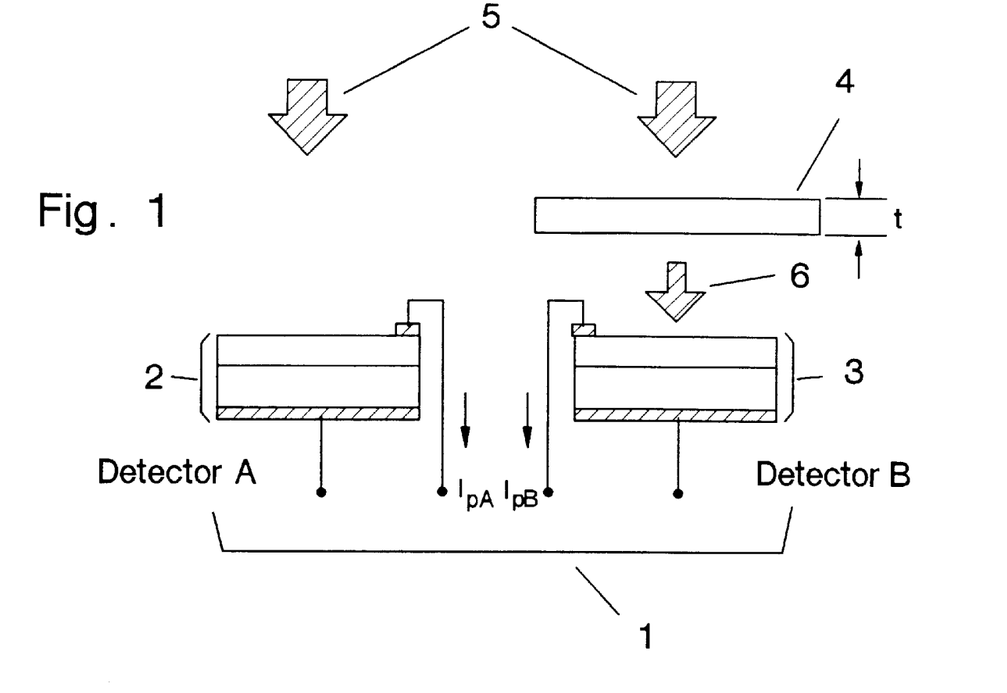
FIG. 1 is a schematic cross sectional view of the wave length determination detector pair with variable attenuator according to one embodiment of the present invention.

The present invention achieves pulsed laser wavelength determination without the need of a large number of optical detectors or optical fiber delay lines. The wavelength determination is achieved using a detector pair (1) with detector A (2) and detector B (3) as shown in FIG. 1. The optoelectronic properties of the two detectors are preferably similar. Detector B is covered by a variable attenuator (4) whose optical absorption coefficient is a monotonic function of the wavelength while detector A is not covered by that variable attenuator. The two detectors (2 and 3) are mounted side by side on the same plane, facing the incident light beam (5) of unknown wavelength. The light beam (6) reaching detector B (3) is attenuated by the variable attenuator (4). Hence, the intensity of the light beam (6) falling on detector B is less than that falling on detector A. The ratio of the photocurrent from detector A to the photocurrent from detector B can be used to determine the wavelength of the incident light beam (5).

Figure 2:
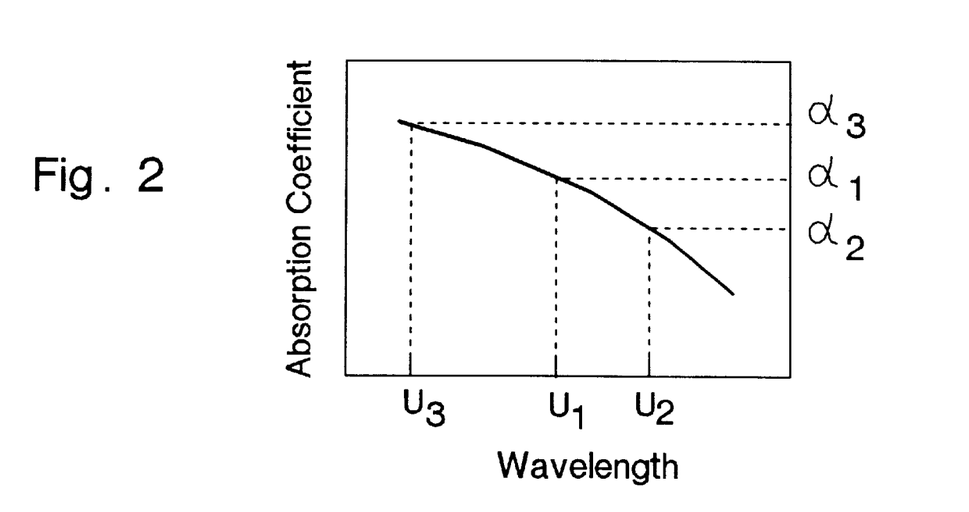
FIG. 2 shows variation of absorption coefficient with wavelength of the variable attenuator.

The material of the variable attenuator (4) is selected so that optical absorption coefficient of the variable attenuator in the wavelength range of detection is a monotonic function of the wavelength (see FIG. 2). Therefore, the ratio of photocurrents is a monotonic function of wavelength in the range of detection. Depending on the wavelength range of operation, the variable attenuators may be fabricated using semiconductors such as Si, Ge, InSb, $Bi_2Te_3$ and HgCdTe.

For a monochromatic light beam of wavelength $U_1$ the absorption coefficient of the variable attenuator is $\alpha_1$. For a monochromatic light beam of wavelength $U_2$, the absorption coefficient of the variable attenuator is $\alpha_2$. At wavelength $U_1$, after passing through the variable attenuator (4), the intensity of the beam (6) for normal incidence is $I_6$ which can be expressed as $I_6 = I_5 \times \exp[-\alpha_1 t]$. Here, $I_5$ is the intensity of the incident beam (5), $\alpha_1$ is the absorption of the variable attenuator at wavelength $U_1$ and t is the thickness of the variable attenuator. To simplify the description, the reflection of light from the variable attenuator is ignored. At wavelength $U_2$, after passing through the variable attenuator (4), the intensity of the beam (6) for normal incidence is $I_6'$ which can be expressed as $I_6'=I_5\times\exp[-\alpha_2 t]$. Here, $I_5$ is the intensity of the incident beam and $\alpha_2$ is the absorption coefficient of the variable attenuator at wavelength $U_2$.

Figure 3:
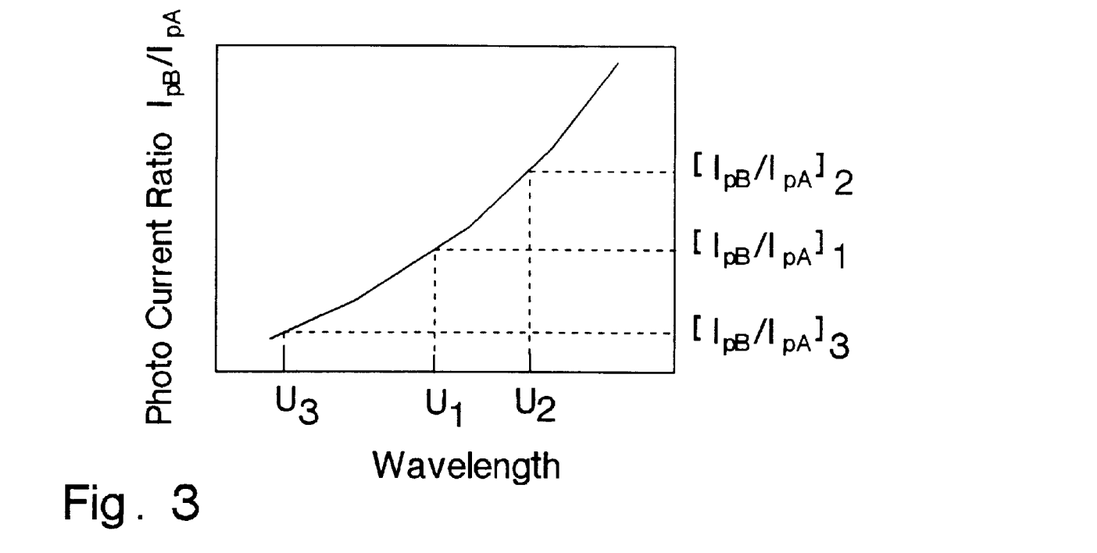
FIG. 3 shows the variation of photocurrent ratio $I_{pB}/I_{pB}$ with wavelength under monochromatic illumination.

It is thus clear that when a monochromatic light beam of wavelength $U_1$ is incident on the detectors, detector B which is covered by the variable attenuator (4) will receive a light beam (6) with intensity $I_6$ whereas detector A which is not covered by the variable attenuator will receive a light beam (5) of an intensity of $I_5$. Since the beam (6) is attenuated by the variable attenuator (4), its intensity will be smaller than that for the unattenuated beam. Therefore, the photocurrent ($I_{pB}$) due to the beam (6) from the detector B (3) will be smaller than the photocurrent ($I_{pA}$) due to the beam (5) from the detector A (2). The ratio of $I_{pB}/I_{pA}$ at wavelength $U_1$, designated as $[I_{pB}/I_{pA}]_1$ in FIG. 3, is smaller than 1 and the value is determined by the absorption coefficient and thickness of the variable attenuator. The ratio of $I_{pB}/I_{pA}$ can then be used to determine the wavelength of the incident light beam (5). When the wavelength of the incident light varies from $U_1$ to $U_2$ and the absorption coefficient of the variable attenuator for the light beam decreases from $\alpha_1$ to $\alpha_2$, the ratio of light intensity incident on the two detectors with and without the variable attenuator will increase. Therefore, the photocurrent ratio $[I_{pB}/I_{pA}]_2$ will be greater than that when the wavelength of the incident light beam is $U_1$. Conversely, when the wavelength of the incident light varies from $U_1$ to $U_3$ so that the absorption coefficient of the light beam increases from $\alpha_1$ to $\alpha_3$, the ratio of light intensity incident on the two detectors with and without the variable attenuator will decrease. Therefore, the photocurrent ratio $[I_{pB}/I_{pA}]_3$ will be less than that when the wavelength of the incident light beam is $U_1$. Since the variable attenuator is designed so that its absorption coefficient is a monotonic function of the wavelength, the photocurrent ratio $I_{pB}/I_{pA}$ from the two detectors will be a monotonic function of wavelength (see FIG. 3). Knowing the variation of the absorption coefficient with wavelength (and thus the photocurrent ratio variation), the wavelength value of a monochromatic light beam can be readily determined by measuring the ratio of photocurrents from the two detectors.

The wavelength determination unit of FIG. 1 may be connected to an electronic circuit and a processor for operation. The processor contains data for values of photocurrent ratio at different wavelengths. When a monochromatic light beam (5) is incident on the detector pair, electrical signals are generated simultaneously in the two detectors (2,3). The electrical pulse signals from detector A and detector B are fed to two amplifier circuits each with an appropriate electrical filter. The filtered and amplified signal from each amplifier circuit is fed to a sample and hold circuit. The electrical signal due to the incident light beam from detector A is connected to the first sample and hold circuit while the signal from detector B is connected to the second sample and hold circuit. A processor continuously monitors the signal levels $I_{pA}$ from detector A from the first sample and hold circuit and retrieves the signals (current values). The signal level is stored in the memory of the processor. After the above, the processor sends a signal to the two sample and hold circuits to clear the signals held in them.

If the signal level from detector A is above a predetermined threshold value, the light intensity is sufficiently high for wavelength determination. The ratio of $I_{pB}/I_{pA}$ is recorded and used to determine the wavelength of the incident monochromatic light beam from data stored in the processor. After the wavelength determination, the processor displays the wavelength using a visual display or an audio display. The processor continues the monitoring for the next incoming pulsed light beam.

Figure 4:
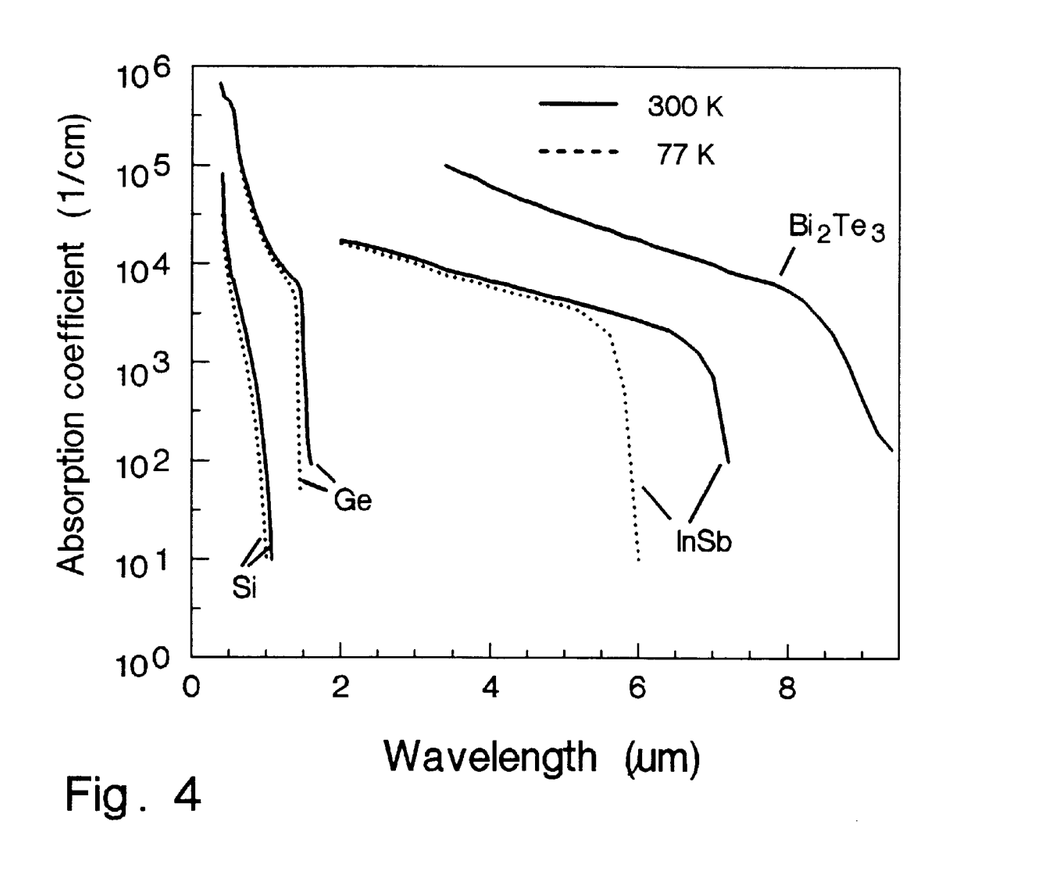
FIG. 4 shows the variation of absorption coefficient with wavelength for Si, Ge, InSb and $Bi_2Te_3$.

The variable attenuator may be constructed using a thin film of semiconductors, deposited on a supportive substrate or directly on the detector surface. The absorption coefficient of a semiconductor generally decreases gradually as the wavelength is increased. As the wavelength approaches the value corresponding to the band gap of the semiconductor, the absorption decreases abruptly with further increase of the wavelength. FIG. 4 shows variation of absorption coefficient of Si, Ge, InSb and $Bi_2Te_3$ with wavelength. It is noted the absorption coefficient of Si decreases from 0.5 to 1.1 $\mu$m whereas it decreases from 0.5 to 1.5 $\mu$m for Ge. For InSb, the wavelength range, with continuous decrease of absorption coefficient, is from 2 to 7 $\mu$m. For $Bi_2Te_3$, the wavelength range extends to 9 $\mu$m. In addition to the above described examples for variable attenuators, substances with absorption coefficients which vary monotonically with the wavelength may be used.

Figure 5:
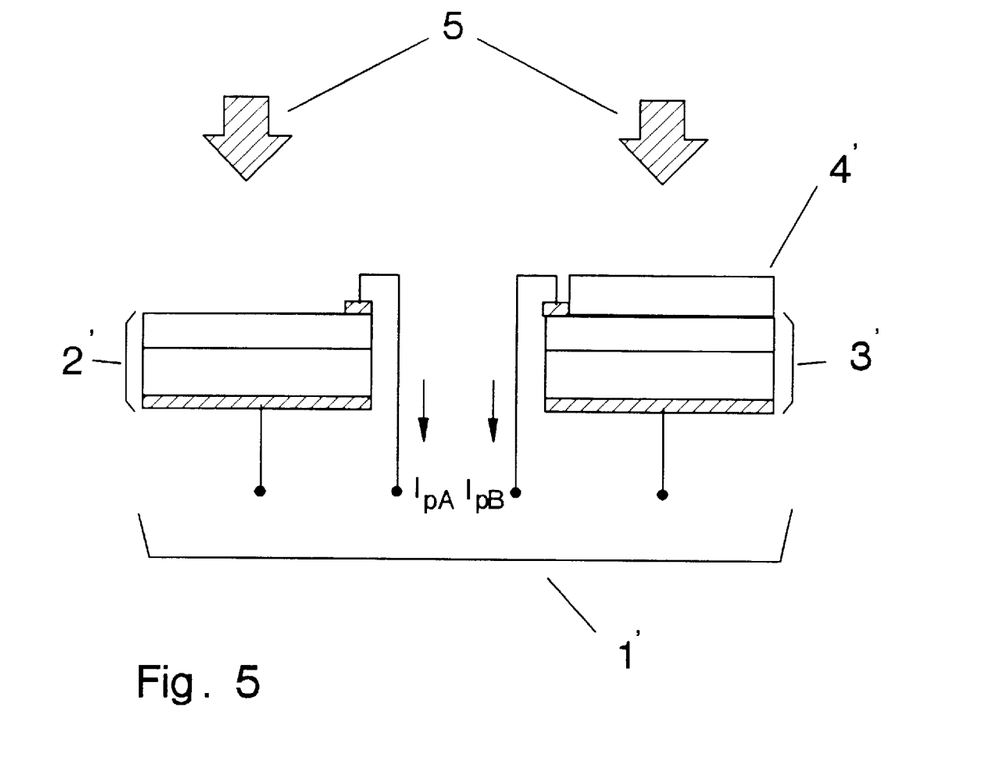
FIG. 5 is a schematic cross-sectional view of the detector pair for a wavelength determination, according to a further embodiment of the present invention, with a variable attenuator deposited directly on one detector.

The variable attenuator may be deposited directly on top of one of the detectors to simplify the fabrication. This is illustrated in FIG. 5 where there is shown a detector pair with variable attenuator (4') deposited directly on detector B (3'). The thickness of the variable attenuator is controlled during the deposition to suit the wavelength range of operation. One advantage of the integrated detector pair is that the size of detecting unit may be reduced. Another advantage is that the temperature of the attenuator may be regulated by regulating the detector temperature. Yet another advantage is that it may allow one to fabricate integrated and miniature detector pairs for the wavelength determination.

In FIG. 6, there is shown cross-sections, after a different stages, of fabrication of an integrated detector v pair with two detectors for wavelength determination. To simplify the description, a detector pair with two p-n junction detectors is shown. It is understood that detector pairs with p-i-n junctions, Schottky junctions, metal semiconductor-metal structures and superconductor bolometers may equally well be used for the wavelength determination. FIG. 6(a) shows a cross-sectional view of a detector pair on a semiconductor substrate (7) with two p-n junction detectors, detector A (8) and detector B (9). Metal electrodes (10, 11, 12) are formed on the front and back surfaces of the detector pair. It is noted that insulator regions (13) are deposited for isolation and protection of the junctions. The fabrication process described is well established for several semiconductors such as Si, InGaAs, InSb and HgCdTe. After the formation of the junctions and electrical contacts (see FIG. 6(b)), a layer of photoresist (14) is applied, exposed to UV light through a photo mask and developed using conditions for lift-off processes. At this point, the active regions of detector A (8) and the metal layer regions (10) and most of (11) are covered by the photoresist (14) while the active region of detector B (9) is exposed. It is noted that the patterned photoresist has an inverted slope and is therefore suitable for lift-off of the variable attenuator layer to be deposited. The thickness of the photoresist is from 1 to 8 $\mu$m, depending the thickness of the variable attenuator to be deposited. After the developing, the detector pair is loaded into a vacuum chamber for the deposition of the variable attenuator (see FIG. 6(c)). A layer of variable attenuator (15, 16) is deposited by thermal evaporation or sputtering. Thickness of the variable attenuator is controlled to obtain appropriate attenuation for the range of wavelengths of operation. For instance, a layer of thermal evaporated Ge with a thickness of 0.5 μm may be deposited for wavelength determination in the wavelength range from 0.7 to 1.5 μm. For variable attenuators to be operated at wavelengths different from the above range, the thicknesses may be different.

Figure 6A:
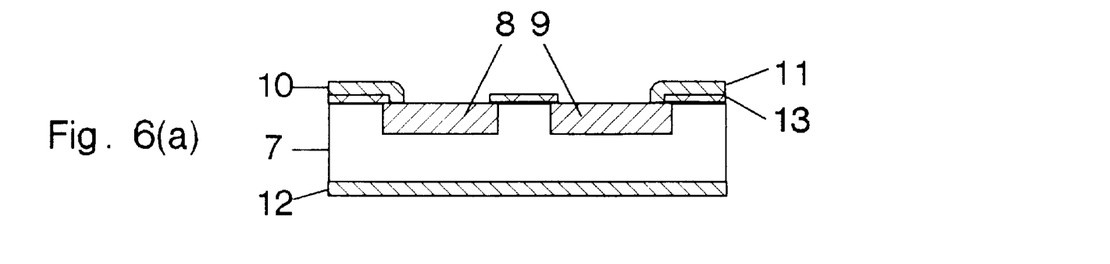
FIG. 6 is a series of cross-sectional views for the fabrication of a detector pair according to the present invention— (a) after the junction and contact formation, (b) after the application and developing of photoresist, (c) after deposition of the variable attenuator layer and (d) after the removal of the photoresist.
Figure 6B:
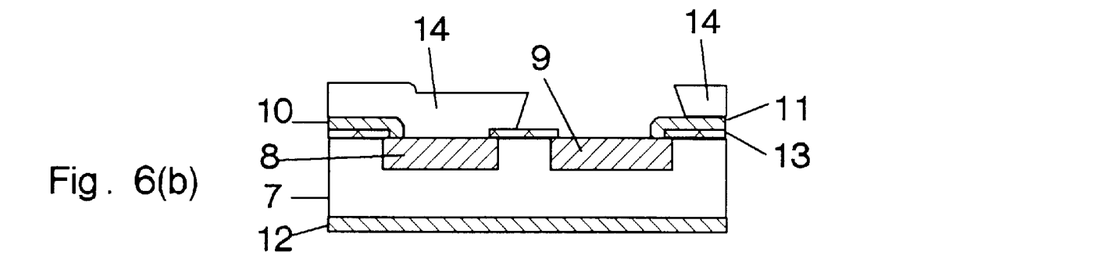
Figure 6C:
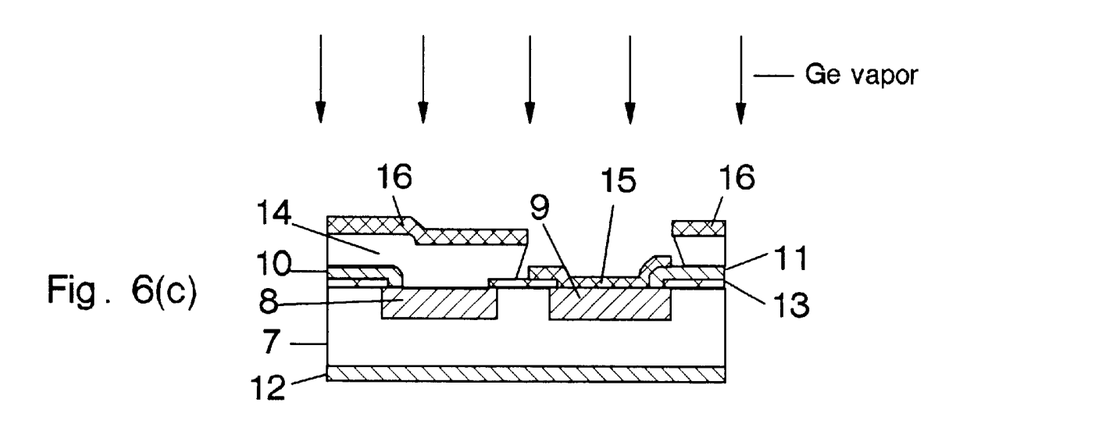
Figure 6D:
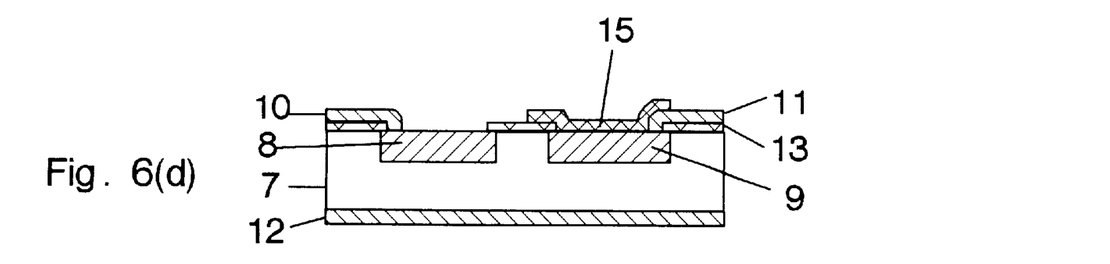

After the deposition of the variable attenuator layer, the detector pair is immersed in acetone (ACE) to remove the photoresist (14) and unwanted Ge (16). A Ge layer (15) remains on the active region of detector B to form a variable attenuator (see FIG. 6 (d)). The detector is now ready for wire bonding and packaging.

Figure 7:
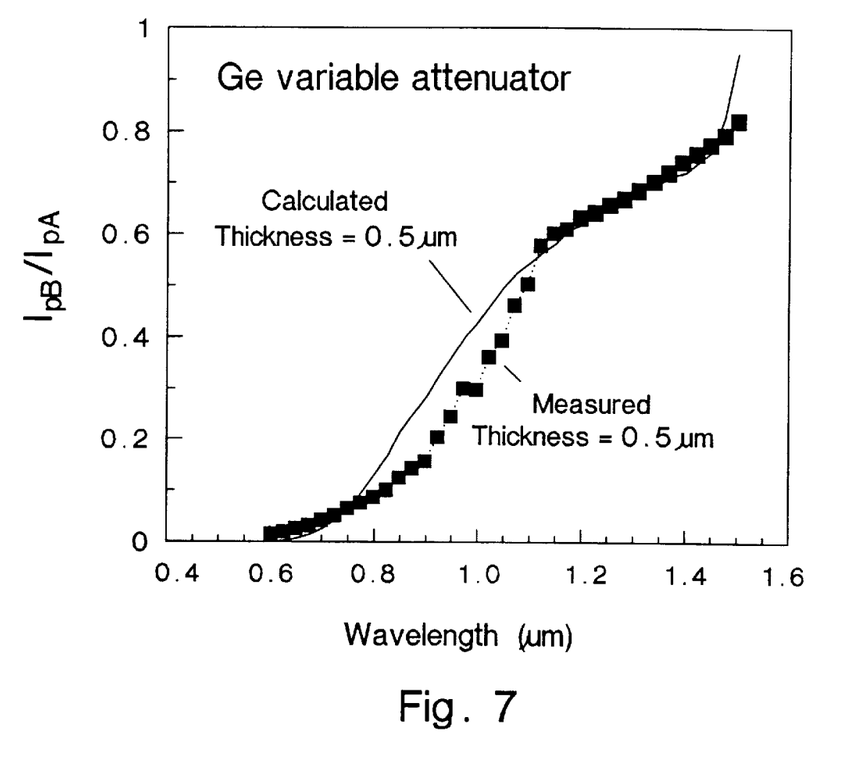
FIG. 7 shows variation of photocurrent ratio $I_{pB}/I_{pA}$ with wavelength for an InGaAs detector pair with a 0.5 μm thick Ge variable attenuator.

FIG. 7 shows the variation of photocurrent ratio $I_{pB}/I_{pA}$ with wavelength for an InGaAs p-i-n detector pair having a thermally evaporated Ge variable attenuator layer. Thickness of the Ge variable attenuator layer is 0.5 μm. It is seen that the photocurrent ratio is a monotonic function of wavelength. The solid curve is calculated from absorption coefficients of monocrystalline Ge taken from the literature. At this point, it is worthwhile to note that the variation in photocurrent ratio $I_{pB}/I_{pA}$ with wavelength for a given variable attenuator material may vary with the thickness. The selection of thickness is determined by the range of wavelengths to be used to operate the detector pair. For instance, the detector pair with the photocurrent ratio shown in FIG. 7 may be conveniently used to determine wavelength of laser beams in the range from 0.8 to 1.4 μm. For operation at wavelengths other than in the above range, variable attenuators and detector pairs different from the ones described above may be used. For instance, InSb (or $Bi_2Te_3$) variable attenuators and InSb detector pairs may be used for the wavelength range from 2 to 6 μm. For operation in the wavelength range of 6 to 12 μm, HgCdTe detector pairs and HgCdTe variable attenuators may be used.

Figure 8:
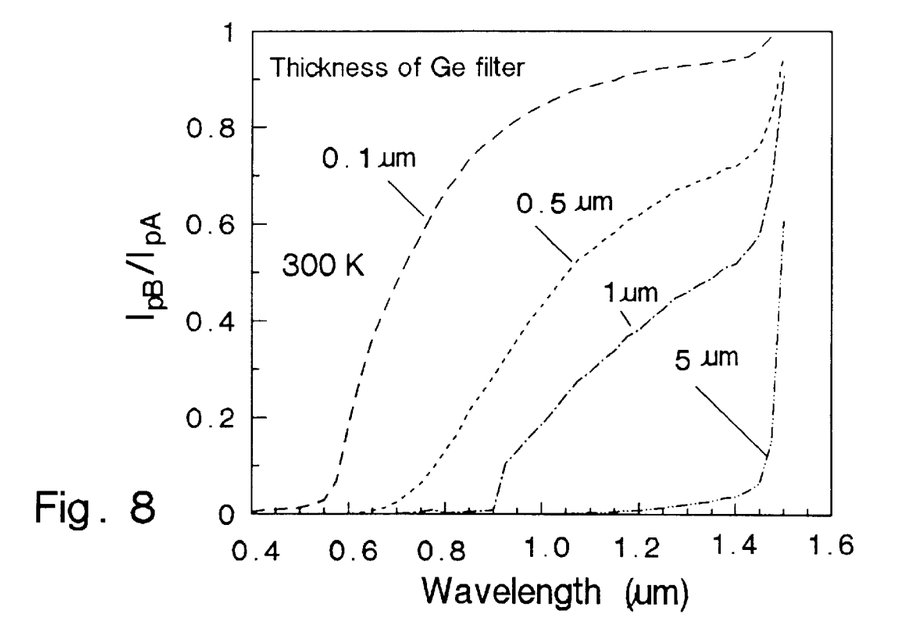
FIG. 8 shows variation of photocurrent ratio with wavelength of Ge variable attenuators (four thicknesses) computed using absorption coefficients of monocrystalline Ge.

To understand the effect of thickness of the variable attenuator on the photocurrent ratio for wavelength determination, refer to FIG. 8 where there is shown variation of photocurrent ratio $I_{pB}/I_{pA}$ with wavelength of four Ge variable attenuators with different thicknesses. In FIG. 8, the photocurrent ratio is computed using known absorption coefficient data given in literature (S. M. Sze, Physics of Semiconductor Devices, second edition, page 750, 1981). When the thickness of a Ge attenuator is equal to 0.1 μm, the photocurrent ratio rises rapidly from 0.2 to 0.8 as the wavelength is increased from 0.6 μm to 0.9 μm. When the thickness of a Ge attenuator is equal to 5 μm, the photocurrent ratio is very small in the wavelength range from 0.4 μ to 1.4 μm and then increases rapidly from 1.45 μm. It is evident that the Ge variable attenuator with a thickness of 0.5 μm is gradual in the wavelength range from 0.8 μ to 1.4 μm. This Ge variable attenuator is thus suitable for the wavelength determination using a detector pair.

Figure 9:
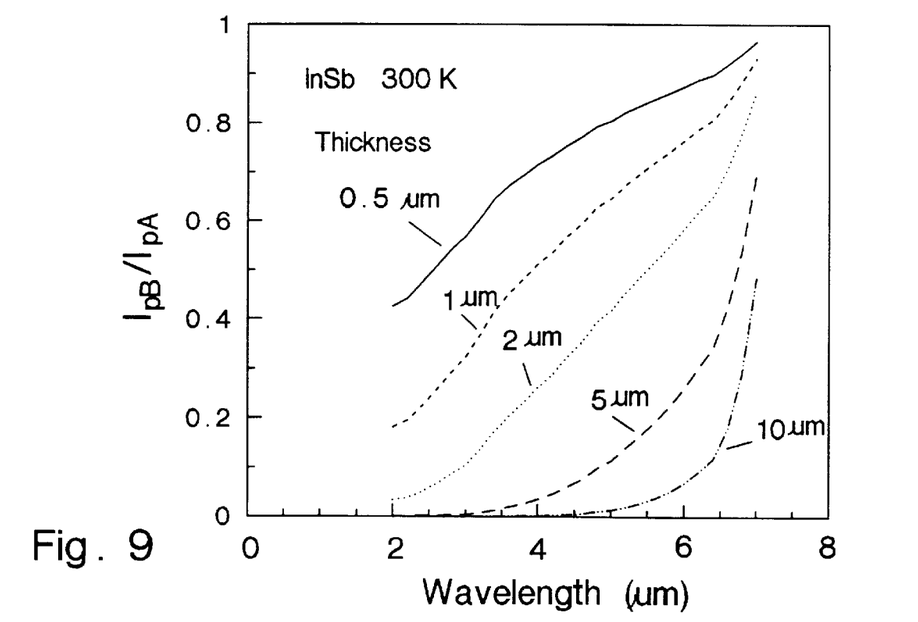
FIG. 9 shows variation of photocurrent ratio with wavelength of InSb variable attenuators (five thicknesses) computed using absorption coefficients of monocrystalline InSb.

In FIG. 9, variation of photocurrent ratio $I_{pB}/I_{pA}$ with wavelength of five InSb variable attenuators with different thicknesses is shown. Here, the photocurrent ratio is computed using known absorption coefficient data given in literature (S. M. Sze, Physics of Semiconductor Devices, second edition, page 751, 1981). When the thickness of an InSb attenuator is equal to 0.5 μm, the photocurrent ratio at a wavelength of 3 μm is about 0.5, although it varies gradually with the increase of wavelength. It is not ideal for the wavelength determination since the change of ratio from 3 μm to 6 μm is relatively small. For the InSb variable attenuators with thicknesses equal to 5 and 10 μm, the photocurrent ratio is small in the wavelength range from 3 to 6 μm. Hence they are not suitable for the determination of wavelength using a detector pair. For the variable attenuators with thicknesses of 1 and 2 μm, the photocurrent ratios at 3 μm are reasonably small and the variation with the wavelength is gradual. Hence, InSb variable attenuators shown in FIG. 9 with thicknesses of 1 and 2 μm are more suitable for wavelength determination than the others.

Figure 10:
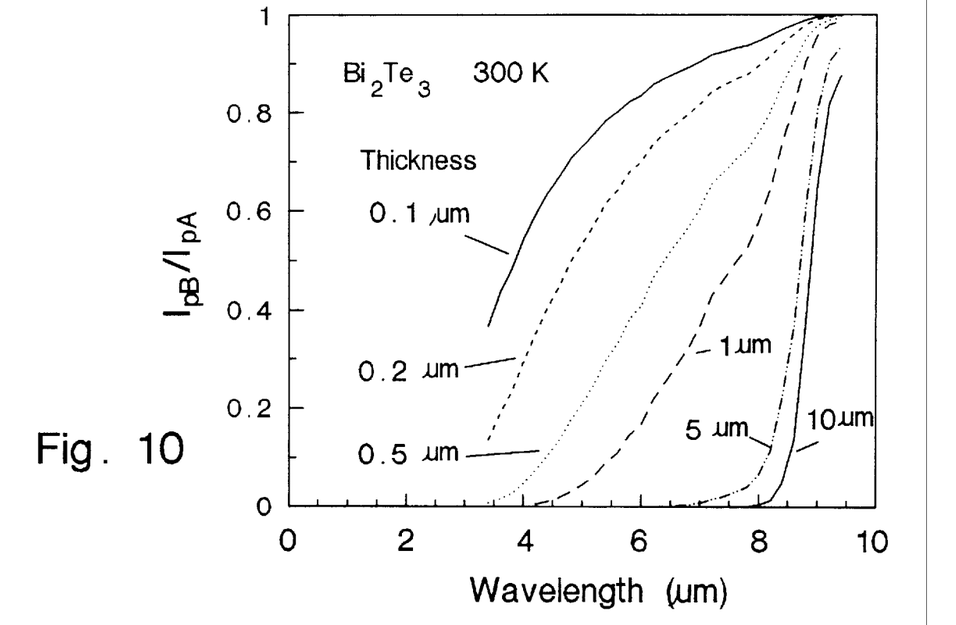
FIG. 10 shows variation of photocurrent ratio with wavelength of $Bi_2Te_3$ variable attenuators (six thicknesses) computed using absorption coefficients of monocrystalline $Bi_2Te_3$.

In FIG. 10, variation of photocurrent ratio $I_{pB}/I_{pA}$ with wavelength of six $Bi_2Te_3$ variable attenuators with different thicknesses is shown. Here, the photocurrent ratio is computed using known absorption coefficient data given in literature (S. M. Sze, Physics of Semiconductor Devices, second edition, page 751, 1981). It is clear that $Bi_2Te_3$ variable attenuators shown in FIG. 10 with thicknesses of 0.2 and 0.5 μm are more suitable for wavelength determination in the wavelength range from 3 to 8 μm than other $Bi_2Te_3$ variable attenuators shown. It is worthwhile to mention that refractive index of $Bi_2Te_3$ is relatively large in the 3 to 8 μm wavelength range. Hence the error of wavelength determination due to angle of incidence of the light beam will be small.

Figure 11:
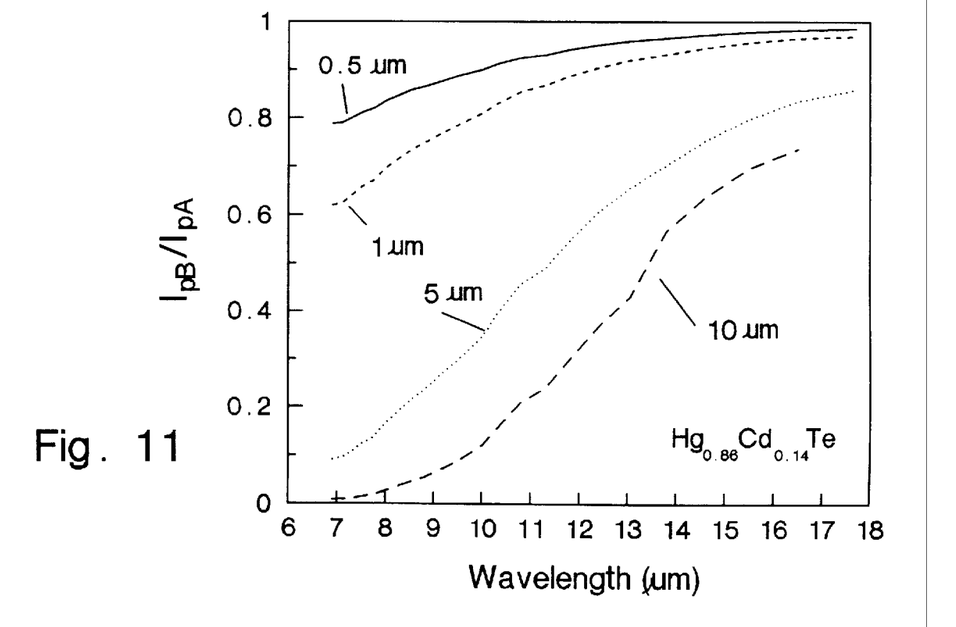
FIG. 11 shows the variation of photocurrent ratio with wavelength of $Hg_{0.86}Cd_{0.14}Te$ variable attenuators (four thicknesses) computed using absorption coefficients of monocrystalline sample.

In FIG. 11, variation of photocurrent ratio $I_{pB}/I_{pA}$ with wavelength of four $Hg_{0.86}Cd_{0.14}Te$ variable attenuators with different thicknesses is shown. Here, the photocurrent ratio is computed using known absorption coefficient data given in literature (Semiconductors and Semimetals, Vol. 5 Infrared Detectors, edited by R. K. Willardson and A. C. Beer, Academic Press, page 202, 1970). It is clear that $Hg_{0.86}Cd_{0.14}Te$ variable attenuator shown in FIG. 11 with a thickness of 5 μm is more suitable for wavelength determination in the wavelength range from 8 to 14 μm than other $Hg_{0.86}Cd_{0.14}Te$ variable attenuators shown. The variable attenuators with a composition of $Hg_{0.86}Cd_{0.14}Te$ are used as examples merely for demonstration of the concept. Variable attenuators of HgCdTe with different Hg/Cd ratios may well be used for the wavelength determination purpose. For variable attenuators of HgCdTe with different Hg/Cd ratios, the variation of optical absorption coefficient with the wavelength may be different from that for the $Hg_{0.86}Cd_{0.14}Te$. Therefore, the thickness may also be different for the wavelength determination in the range from 8 to 14 μm.

Figure 12:
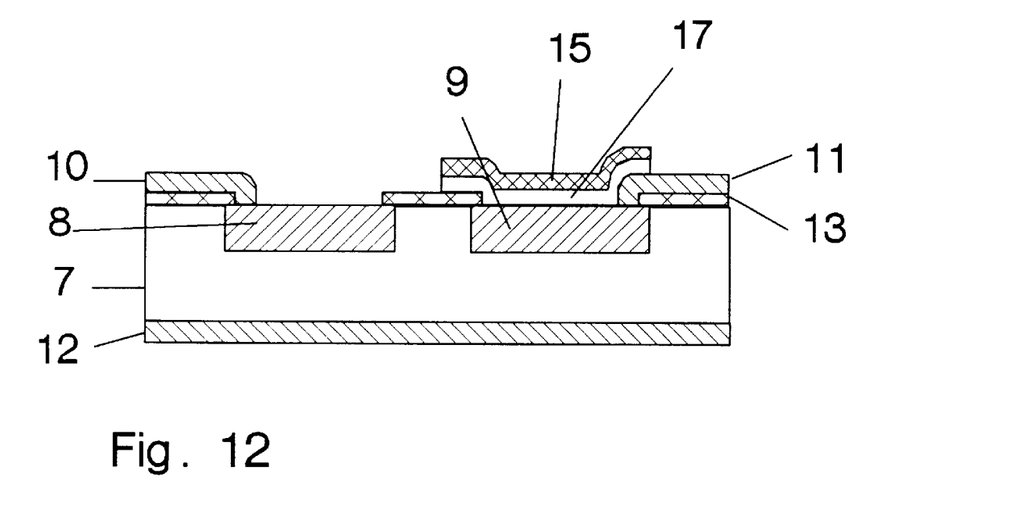
FIG. 12 shows a schematic cross-section of a detector pair, according to another embodiment of the present invention, with an electrically insulating layer deposited between one detector and the variable attenuator.

When photoconductive type detectors are used to form the detector pair for wavelength determination, the lateral conductance of the variable attenuator layer may degrade detector pair optoelectronic performance. In order to minimize the effect that variable attenuator conductance may have on the detectors, as shown in FIG. 12 a thin layer of insulator (17) may be deposited on detector (9) and part of the metal layer (11) prior to the deposition of the variable attenuator (15). Several optically transparent insulators may be used for different ranges of wavelengths. For visible and near infrared operation (0.6 to 2 μm), either SiN or $SiO_2$ may be used. For operation in the wavelength range from 2 to 14 μm, either ZnSe or ZnS may be used. These insulator layers may be deposited by chemical vapour deposition, thermal evaporation or sputtering.

Figure 13:
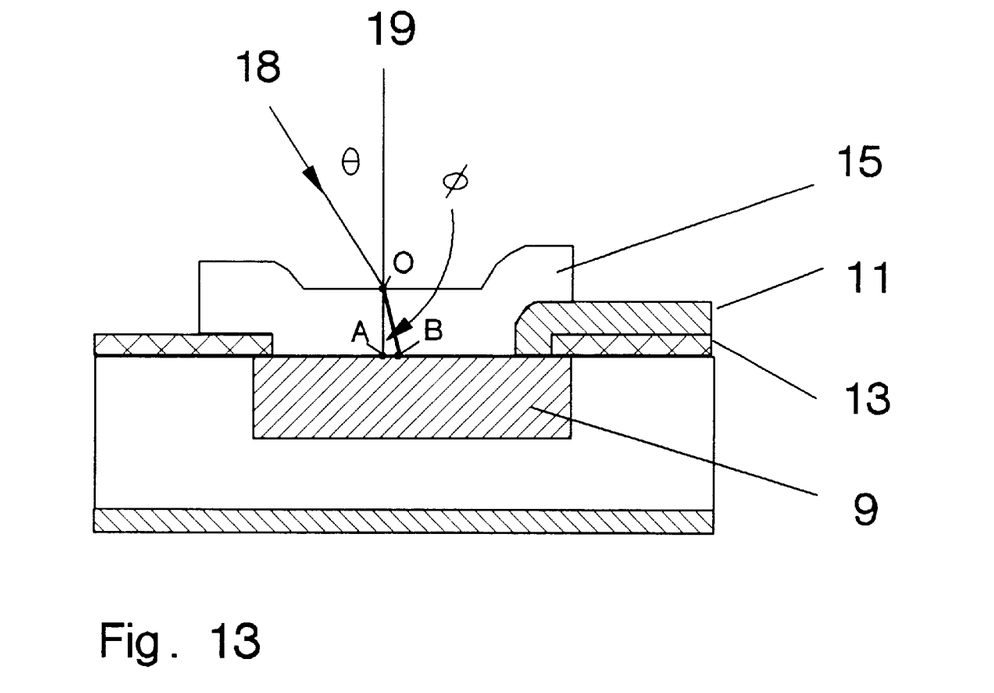
FIG. 13 is a cross-sectional view of one detector in a detector pair showing the effect of angle of incidence (e) on the optical path of the light beam (OB)

Another feature of the invention is in the selection of materials for the variable attenuators. As shown in FIG. 13, when an incident light beam (18) is at an angle (θ) to the normal of the variable attenuator (19), the intensity of the light beam falling on detector (9) will vary and cause an error in the photocurrent ratio. This is due to the optical path length (OB) in the variable attenuator which is greater than the thickness of the variable attenuator (OA). It is preferable to keep the ratio of OA/OB or OB/OA as close to 1 as possible so that the variation in photo cur rent ratio is small. The value of OA/OB can be found from the following equation: $n_o \sin(\theta) = n_a \sin(\phi)$ where no is 1 (air) and $n_a$ is the refractive index of the variable attenuator. From the above equation, the ratio of OA/OB can be expressed as: OA/OB= $[1-(\sin^2\theta)/(n^2_a 2)]^{1/2}$. It is clear a that in order to minimize the variation in OA/OB with the variation of θ, the refractive index of the variable attenuator must be as large as possible. When a variable attenuator with relatively large refractive index is used, the beam in the variable attenuator will be closer to the normal to the surface even when the incident light beam is at an angle to the normal. For operation with angles of incident beams $-45°\leq\theta\leq45°$, it is preferred to have variable attenuators with refractive indexes greater than 2.

For the semiconductors considered in the above description, the refractive indexes are relatively large. For a instance, $n_{Ge}\approx4$, $n_{InSb}\approx4$, $n_{Bi_2Te_3}\approx6$, $n_{Hg_{0.18}Cd_{0.82}Te}\approx4$. Hence, the variation in OA/OB with the variation of θ can be minimized in using the above semiconductors as variable attenuators. It is noted that in addition to the above examples, there are many other selections of the materials.

Figure 14:
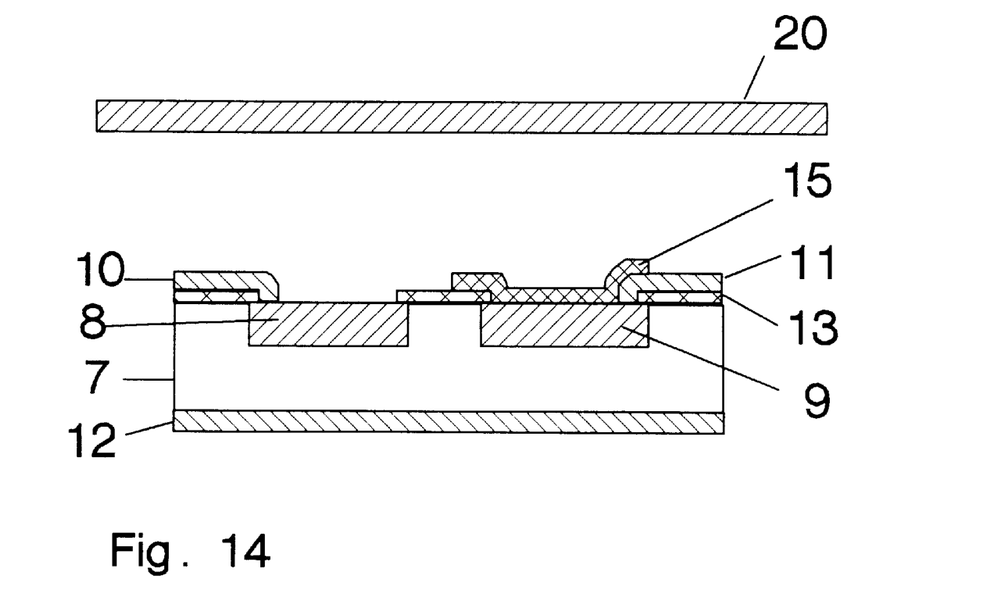
FIG. 14 shows a band pass optical filter installed in front of a detector pair to minimize noise.

For a detector pair with variable attenuator for wavelength determination, it is often preferable to specify the wavelength range of operation. In such applications, it is preferable to limit only the light beams within the specified wavelength range that reach the detector pair. All other light beams outside the specified wavelength range must be blocked in order to minimize noise in the detector pair. FIG. 14 shows another embodiment of this invention where a band pass optical filter (20) is installed in front of the detector pair. The wavelength band of transmission of the optical filter is selected according to the response range of the detector pair and the variable attenuator.

Figure 15:
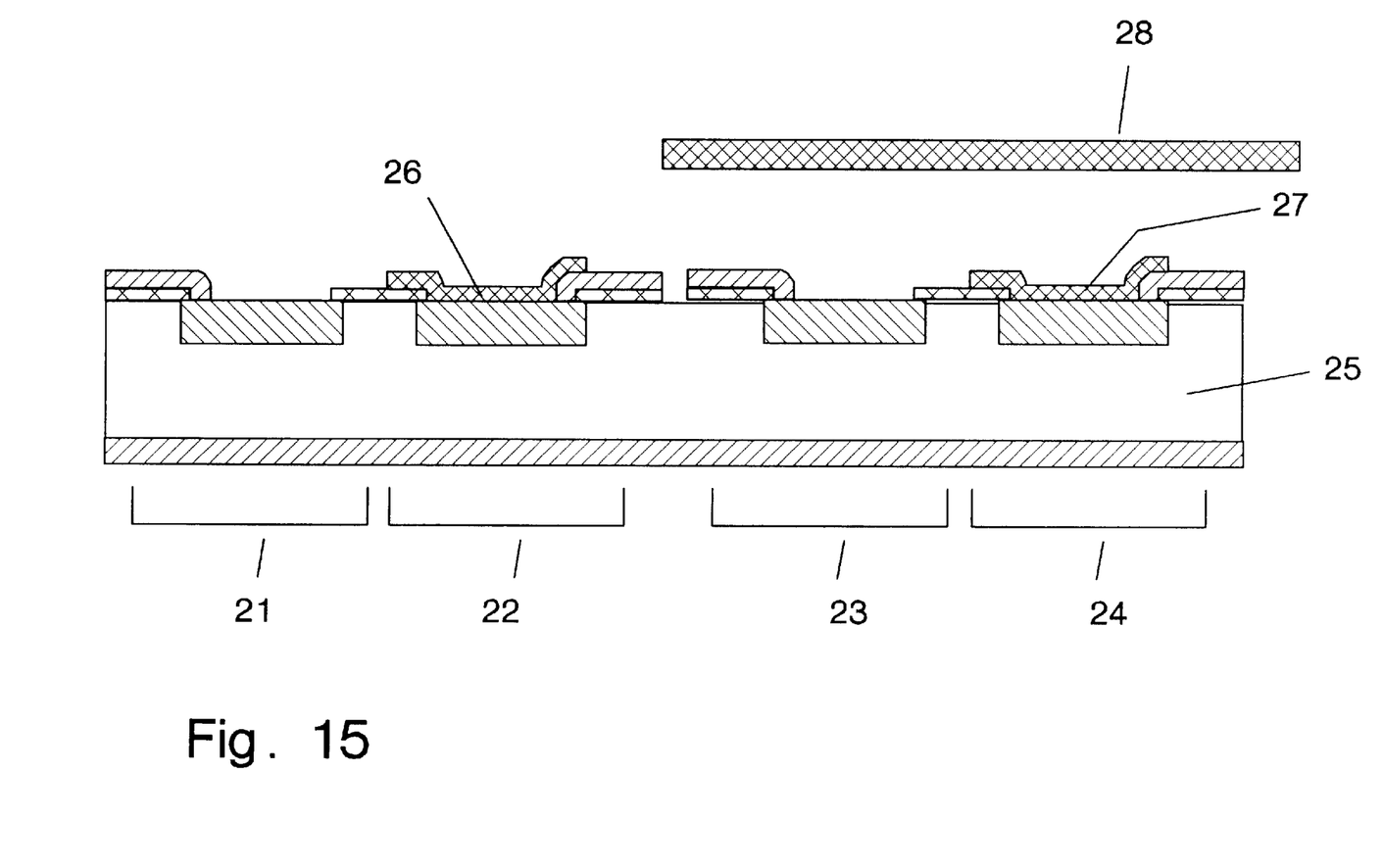
FIG. 15 shows a neutral attenuator installed in front of one of the detector pairs in a two detector pair unit to increase the dynamic range for wavelength determination.

There can be a situation when the intensity of the incident monochromatic light is so high that detector A or even detector B (referring back to FIG. 1) reaches a saturation condition. When this occurs, the ratio of the photocurrents from the two detectors $I_{pB}/I_{pA}$ for the light wavelength determination may not be correct. To overcome this problem, additional detector pairs can be incorporated into the detector unit. A detector unit containing two detector pairs is shown in FIG. 15. Here, in addition to the two detectors (21,22) which form the first detector pair, another two detectors (23,24), which form the second detector pair, are fabricated on the same semiconductor substrate (25). The first detector pair is aligned side by side with the second one. The dimensions and optoelectronic proper ties of detectors (23,24) are the same as the dimensions and properties of the detectors (21,22). Both detectors (22) and (24) are covered by variable attenuators (26,27).

A neutral optical attenuator (28) for operation in the wavelength range of interest is installed in front of detectors (23,24). Detectors (21,22) are not covered by the neutral attenuator (28). The neutral attenuator is selected so that the transmission of light in the wavelength range of interest is in the 1–10% range. When an incident light beam falls on the detector unit, sample and hold circuits connected to the two detectors (21,23) will be triggered to sample and hold the photo current values from the detectors. A processor will monitor in a continuous manner the output a currents, $I_{pA}$, from both detectors (21,23).

As one or more of the current values is greater than a predetermined value, the magnitudes of $I_{pA}$ from detector (21) and $I_{pA}$ from detector (23) are compared. If $I_{pA}$ from detector (21), which is not covered by the neutral attenuator, exceeds a predetermined saturation threshold value then detector (21) is saturated by the incident light beam. When this occurs, the photocurrents from detectors (21,22) are discarded and will not be used for wavelength determination. Detectors (23,24), which are not saturated, photocurrents are then used for wavelength determination. By using more than one detector pair with neutral attenuators, the dynamic range of operation for wavelength determination can be increased.

Figure 16:
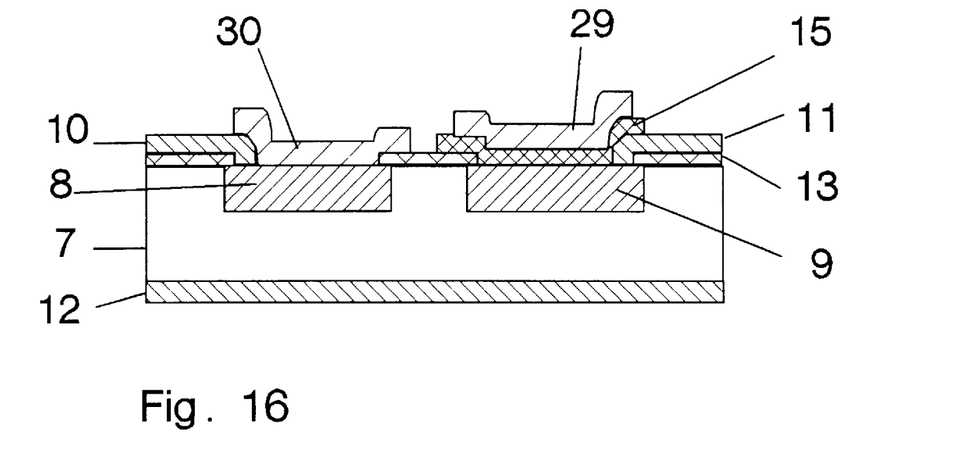
FIG. 16 shows anti-reflective coatings installed on a detector pair to minimize reflection of light from surfaces.

Still another embodiment of the present invention is given in FIG. 16 where there is shown to an anti reflection coating layers (29, 30) deposited on a variable attenuator (15) of detector B and on detector A for wavelength determination. The anti-reflection layer minimizes reflection of light beam from the surfaces of the detector pair to increase the signal levels. The materials and thicknesses of the anti-reflection layers are selected according to the wavelength range of operation.

While the invention has been described in conjunction with illustrated embodiments, it will be understood that it is not intended to limit the invention to such embodiments. On the contrary, it is intended to cover all alternatives, modifications and equivalents as may be included within the spirit and scope of the invention as defined by the appended claims. The photodetectors, for instance, may be photoconductive or photovoltaic detectors, double Schottky barrier detectors, p-i-n detectors, avalanche detectors or superconductor bolometric detectors.

The embodiments of the invention in which an exclusive property or privilege is claimed are defined as follows:

1. A method for detection and wavelength discrimination of a monochromatic light beam with at least one detector pair consisting of a first photo detector and a second photodetector aligned with the first photo detector and a wavelength dependent variable attenuator on top of said second photo detector, the method comprising the steps of;

measuring a first photo current generated in said first photo detector due to illumination of said monochromatic light beam;

measuring a second photo current generated in said photo detector due to illumination of said monochromatic light beam through said variable attenuator;

comparing value of said first photo current with a threshold value to detect if the intensity of Laid monochromatic light beam is sufficient for wavelength determination; and     obtaining a ratio between value of said second photo current's value and said first photo current's value; and determining the wavelength of said light beam from said ratio.

2. A method for detection and wavelength discrimination of said monochromatic light beam as defined in claim 1, wherein absorption coefficient of said variable attenuator is a monotonic function of wavelength within a wavelength range of detection and wavelength discrimination.

3. The method for detection and wavelength discrimination of said monochromatic light beam as defined in claim 1, wherein an amplifying means amplifies photocurrents from said first photo detector and said second photo detector, an electrical filtering means filters noises in said photo currents, and a trigger means sample and hold circuits to sample and hold said photo currents.

4. The method for detection and wavelength discrimination of said monochromatic light beam as defined in claim 1, wherein detection of said monochromatic light beam is achieved by comparing photo current from said first photo detector with a threshold value; indication for the presence of said light beam being produced when said photo current is greater than said threshold value.

5. A device for detection and wavelength discrimination of a monochromatic light beam comprising:

at least one detector pair consisting of a first photo detector and a second photo detector aligned with the first photo detector and a wavelength dependent variable attenuator superimposed over said second photo detector, the device having means for measuring a first photo current generated in said first photo detector due to illumination by said monochromatic light beam;

means for measuring a second photo current generated in said second photo detector due to illumination by said monochromatic light beam through said variable attenuator;

means for obtaining a ratio between a value of said second photo current and a value of said first photo current; and means for determining the wavelength of said light beam from said ratio.

6. A device for detection and wavelength discrimination of said monochromatic light beam as defined in claim 5, wherein absorption coefficient of said variable attenuator is a monotonic function of wavelength within a wavelength range of detection and wavelength range of detection and wavelength discrimination.

7. A device for and wavelength discrimination of said monochromatic light beam as defined in claim 6, wherein a band pass optical filter is located in front of and substantially parallel to said first photo detector and said second photo detector to minimize noises.

8. A device for detection and wavelength discrimination of said monochromatic light beam as defined in claim 5, wherein a neutral attenuator is located in front of said first photo detector and second photo detector to increase the dynamic range of the detection and further comprising a second detector pair with another wavelength dependent variable attenuator being superimposed over one photo detector of the second detector pair, the second detector pair being located adjacent said one detector pair, the said one detector pair and second detector pair being identical with the second detector pair being located outside of an area covered by the neutral attenuator.

9. A device for detection and wavelength discrimination of said monochromatic light beam as defined in claim 5, wherein an anti-reflection layer is located on said first photo detector and said variable attenuator to enhance sensitivity.

10. A device for detection and wavelength discrimination of said monochromatic light beam as defined in claim 5, wherein said photo detectors are selected from the group consisting of photoconductive detectors, photovoltaic detectors, double Schottky barrier detectors, p-i-n detectors, avalanche detectors and superconductor bolometric detectors.

11. A device for detecting and wavelength discriminating of a monochromatic light beam comprising:

at least one detector pair consisting of a first photo detector and a second photo detector adjacent to each other on a single substrate, a thin film wavelength depend ent variable attenuator being superimposed on a surface of the second photo detector, the device having means for measuring a first photo current generated in said first photo detector due to illumination by said monochromatic light beam;

means for measuring a second photo current generated in said second photo detector due to illumination by said monochromatic light beam through said variable filter;

means for obtaining a ratio between said second photo current and said first photo current; and means for determining the wavelength of said light beam from said ratio.

12. A device for detection and wavelength discrimination of said monochromatic light beam as defined in claim 11, wherein absorption coefficient of said variable attenuator is a monotonic function of wavelength within a predetermined wavelength range and the variable attenuator has a refractive index greater than 2.

13. A device for detection and wavelength discrimination of said monochromatic light beam as defined in claim 11, wherein said variable attenuator has a refractive index $\geq 4$.

14. A device for detection and wavelength discrimination of said monochromatic light beam as defined in claim 11, wherein a thin layer of optical transparent insulator is located between the second photo detector and said variable attenuator.

15. A device for detection and wavelength discrimination of said monochromatic light beam as defined in claim 11, wherein the variable attenuator is formed of a material selected from the group consisting of Ge, InSb, $Bi_2Te_3$, HgCdTe and Si.

16. A device for detecting and wavelength discrimination of said monochromatic light beam as defined in claim 11, wherein a bandpass optical filter is located in front of and substantially parallel to said detector pair.

17. The device for detecting and wavelength discrimination of said monochromatic light beam as defined in claim 11, wherein an anti-reflective layer is located on said first photodetector and said variable attenuator.

18. The device for detecting and wavelength discrimination of said monochromatic light beam as defined in claim 11, wherein a neutral attenuator is located in front of said one detector pair and further comprising a second detector pair with another thin film wavelength dependent attenuator being superimposed on one photodetector of the second detector pair, the said one detector pair and second detector pair being identical and formed on a single substrate with the second detector pair being located at an area outside of that covered by the neutral attenuator.

19. The device for detection and wavelength discrimination of said monochromatic light beam as defined in claim 14, wherein the thin layer of optical transparent insulator is formed of a material selected from the group consisting of SiN, $SiO_2$, ZnSe and ZnS.

20. The device for detection and wavelength discrimination of said monochromatic light beam as defined in claim 11, wherein the photodetectors are selected from the group consisting of photoconductive detectors, photovoltaic detectors, double Schottky barrier detectors, p-i-n detectors, avalanche detectors and superconductor bolometric detectors.

* * * * *